United States Patent [19]
Posnansky et al.

[11] 4,399,919
[45] * Aug. 23, 1983

[54] VACUUM FLASK

[75] Inventors: Mario Posnansky, Melchenbühlweg 18, 3006 Bern (Canton of Bern); Urs Utiger, Oberönz, both of Switzerland

[73] Assignee: Mario Posnansky, Berne, Switzerland

[*] Notice: The portion of the term of this patent subsequent to Apr. 8, 1997 has been disclaimed.

[21] Appl. No.: 878,736

[22] Filed: Feb. 17, 1978

[30] Foreign Application Priority Data

Feb. 23, 1977 [CH] Switzerland ............... 2216/77
Jun. 22, 1977 [DE] Fed. Rep. of Germany ....... 2728050

[51] Int. Cl.³ .................................... A47J 41/02
[52] U.S. Cl. .................... 215/13 R; 220/410; 220/420; 220/441; 126/443
[58] Field of Search .............. 215/11 R, 11 C, 12 R, 215/13 R; 220/410, 415, 420, 441, 466; 126/443, 417, 451

[56] References Cited
U.S. PATENT DOCUMENTS

| | | | |
|---|---|---|---|
| 1,989,999 | 2/1935 | Niederle | 126/443 |
| 3,225,954 | 12/1965 | Herrick | 220/420 |
| 3,331,522 | 7/1967 | Bridges | 220/420 |
| 3,863,794 | 2/1975 | Hata | 215/13 R |
| 3,939,834 | 2/1976 | McMahon | 215/13 R |
| 3,987,781 | 10/1976 | Nozik | 126/443 |
| 4,138,027 | 2/1979 | Frye | 215/13 R |
| 4,156,420 | 5/1979 | Gunderson | 126/443 |

Primary Examiner—Herbert F. Ross
Attorney, Agent, or Firm—Howard C. Miskin

[57] ABSTRACT

In a flask comprising a closed vessel with double walls enclosing a vacuum, layers of substances capable of absorbing light-rays and/or of selectively acting upon light-rays are applied to enable more radiant energy to reach the space enclosed by the inner wall than that space can radiate to the outside. Thus an increasing amount of heat is supplied to the space enclosed by the inner wall, and cold matter introduced into that space is heated. The effect of the light-rays can be increased by designing part of a protective jacket of the flask so that it is capable of being swung open and of acting as a reflector in that position.

5 Claims, 7 Drawing Figures

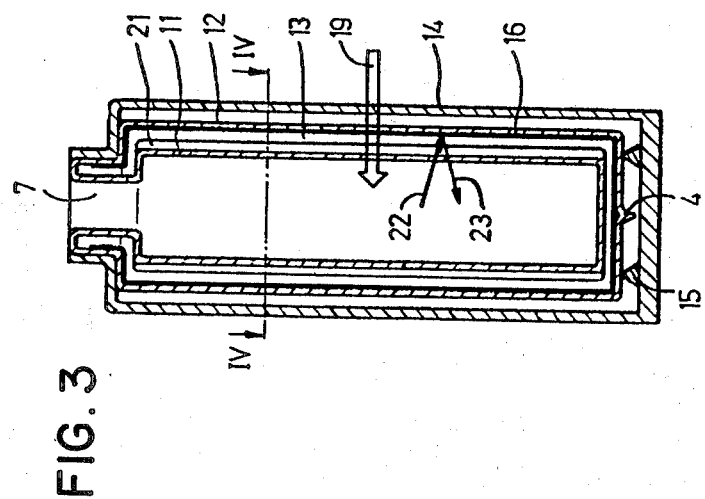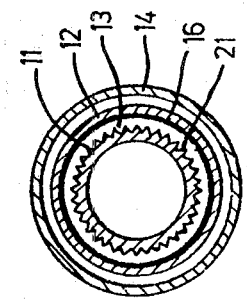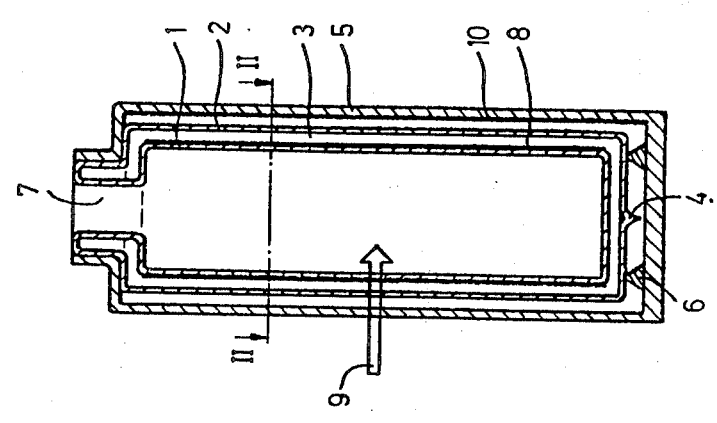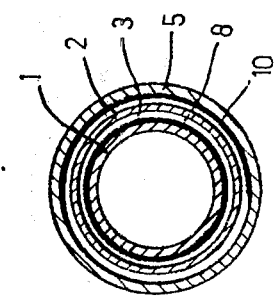
FIG. 3
FIG. 4
FIG. 1
FIG. 2

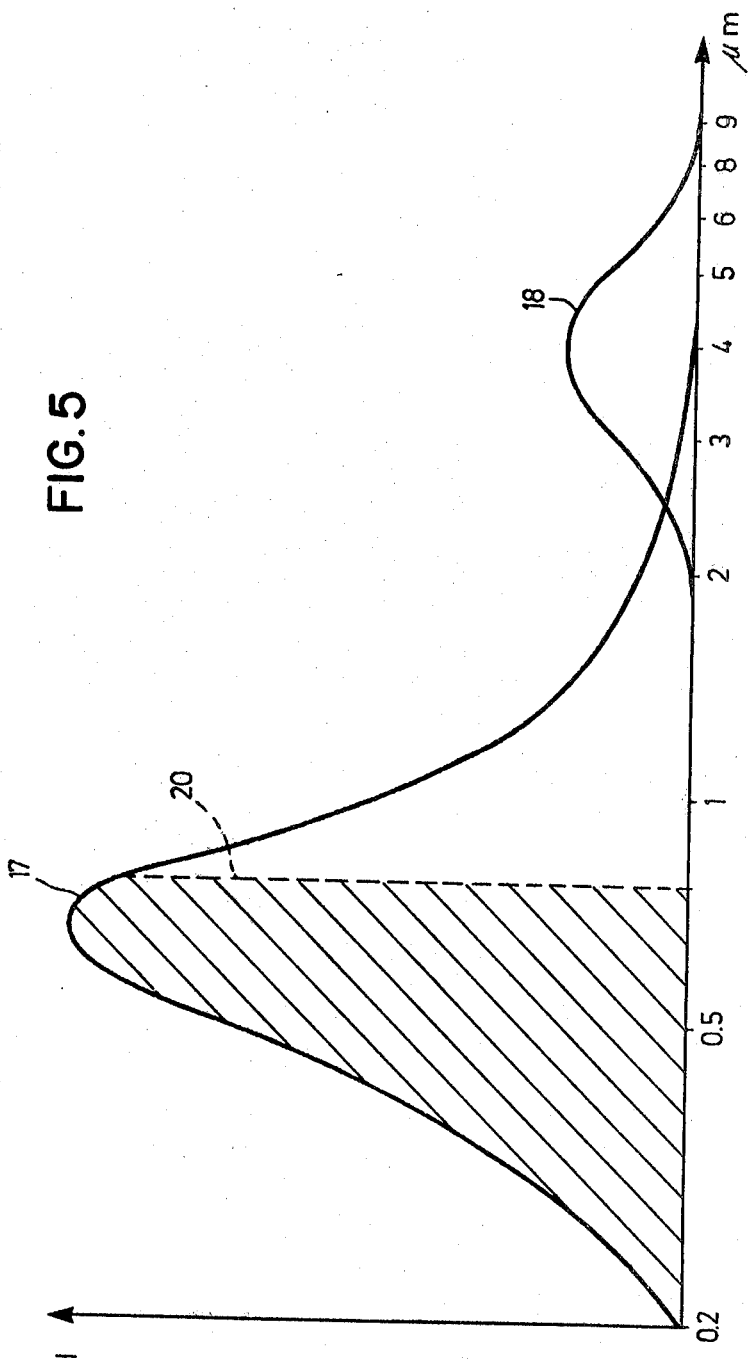

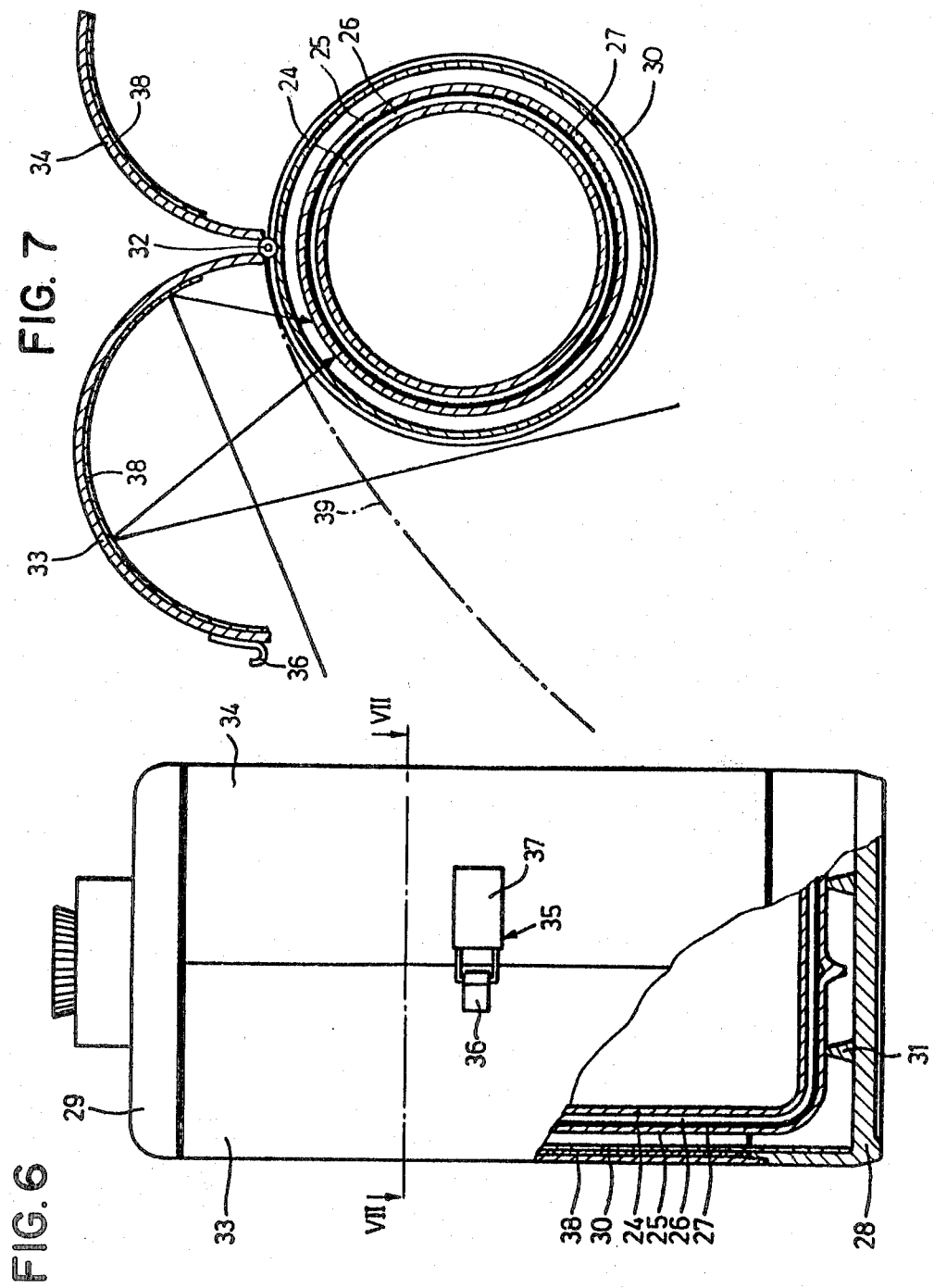

VACUUM FLASK

This invention relates to vacuum flasks such as are usually used for keeping substances hot or cold by insulation.

All previously known and commercially available vacuum flasks consist essentially of double-walled vessels, the gap between the walls being exhausted of air. The walls are usually made of glass, and together with the vacuum which they enclose, they provide good heat insulation, the thermal insulation coefficient being the same from the outside in as from the inside out, so that not only can a hot substance be kept hot, but a cold substance can be kept cold. In order to increase the insulating capacity, it is common practice to coat one or both of the walls with a reflective layer which prevents any outside radiation from reaching the inside of the flask, and vice versa. The double-walled vessel is housed within a protective jacket, preferably of metal, in order to shield it from mechanical damage.

It is an object of this invention to provide a vacuum flask of the aforementioned kind in which an initially cold substance can be heated to and kept at a higher temperature by the use of natural light radiation.

To this end, according to the present invention, there is provided a vacuum flask comprising a vessel having an inner wall and an outer wall together bounding a space exhausted of air, and a protective jacket capable of enclosing the vessel, wherein a layer of a substance having a coefficient of absorption of at least 0.8 for short-wave solar radiation is disposed on the side of the inner wall facing the space exhausted of air, the jacket being at least partially permeable to light-rays or capable of being swung open, and at least the outer wall being permeable to light-rays.

Preferred embodiments of the invention will now be described in detail with reference to the accompanying drawings, in which:

FIG. 1 is a longitudinal section through a first embodiment of a vacuum flask according to the invention, FIG. 2 is a cross-section taken on the line II—II of FIG. 1, FIG. 3 is a longitudinal section through a second embodiment of the vacuum flask, FIG. 4 is a cross-section taken on the line IV—IV of FIG. 3, FIG. 5 is a graph showing the terrestrial solar spectrum and the reflection of a hot body, FIG. 6 is an elevation, partially in section, of a further embodiment of the vacuum flask, and FIG. 7 is a cross-section taken on the line VII—VII of FIG. 6, part of the vacuum flask of FIG. 6 being shown in an opened-out position.

FIGS. 1 and 2 show a first embodiment of the vacuum flask according to the present invention, having a double-walled glass vessel with an inner wall 1 completely surrounded by an outer wall 2. A space 3 between the walls 1 and 2 is exhausted of air. This vacuum has been obtained by pumping air out through a pump nipple 4 in the base of the outer wall 2 and then sealing off the nipple 4. In order to improve the vacuum, a getter may be disposed within the space 3 in proximity to the sealing body (not shown). The double-walled vessel is enclosed within a protective jacket 5 made of a material which is as light-permeable as possible. The base of the outer wall 2 is spaced from the base of the jacket 5 by means of a ring 6 of resilient and heat-insulating material. The opening 7 of the double-walled vessel may be closed by a plug (not shown) such as is customarily used with conventional vacuum flasks. A safety valve will preferably be built into the plug.

A layer 8 is disposed on the side of the inner wall 1 facing the space 3. The layer 8 is of a material which absorbs sunlight as completely as possible. The portion of the sunlight striking the layer 8 almost without hindrance through the jacket 5 and the outer wall 2, as indicated by an arrow 9, is converted into heat. The substance with which the vessel has been filled (not shown) is thereby heated. The exhausted space 3 forms a very good heat insulation, so that substantially less heat reaches the outside through the space 3 than reaches the layer 8 by means of the shortwave portion of the solar radiation. As a result, the layer 8, the inner wall 1, and the filled-in substance are heated. The maximum temperature to which the substance is heated is that temperature at which the heat loss, which occurs by reflection of the layer 8 and rises with increasing temperature, is equally great through the space 3 to the outside as the heat supplied to the layer 8 by the aforementioned portion of the solar radiation.

The surface area of the layer 8 facing the space 3 is preferably increased by means of ribs forming elevations and depressions, whereby the coefficient of absorption of the layer 8 becomes greater. Since any object is normally irradiated by the sun from only one side, it is advantageous to provide half of the inside of the jacket 5 with a reflective coating 10. In this way not only is the heat loss on the non-irradiated side of the vessel reduced, but more rays are collected and focused on the layer 8. The smaller heat loss and greater amount of rays yield better efficiency. In order that the vacuum flask may be exposed to the solar radiation in the correct position, the half of the jacket 5 which is provided with the coating 10 must be recognizable from the outside.

The inner wall 1 may be made of glass or of metal, preferably copper or stainless steel. In the case of a metal wall 1, the layer 8 may be a coat of paint, of as dark a colour as possible, which is a good conductor of heat.

The protective jacket 5 may be made of glass or of a translucent or transparent synthetic material. What is important is that as great a portion as possible of the visible solar radiation can reach the doubled-walled vessel through the jacket 5. If a selective material is used for the layer 8, having a high coefficient of absorption ($\alpha = 0.8$ minimum) for short-wave light and a low coefficient of emission ($\epsilon = 0.1$ maximum) for long-wave radiation, the above-mentioned heat loss is still further diminished. Such a material is, for instance, the so-called "black chromium" or "black nickel". If instead of a single layer 8, a two-layer overlay is used, the one layer being copper and the other a metallic carbide, this overlay will have a coefficient of absorption $\alpha$ of 0.83 for short-wave light and a coefficient of emission $\epsilon$ of 0.03 for long-wave radiation.

FIGS. 3 and 4 illustrate another embodiment of the vacuum flask according to the present invention. It comprises a double-walled vessel having an inner wall 11 and an outer wall 12. The walls 11 and 12 enclose a space 13 which has been exhausted of air for achieving good heat insulation. The double-walled vessel is surrounded by a protective jacket 14 made of a material which is at least translucent. Disposed between the base of the outer wall 12 and the base of the jacket 14 is a ring 15 of resilient and heat-insulating material. A selective layer 16 is applied to the side of the outer wall 12 facing the space 13. The selective layer 16 is permeable to short-wave solar radiation, ideally to the visible range of sunlight, and reflects long-wave radiation having wavelengths above 2,5 microns. The selective layer 16 may, for example, be a layer of indium oxide or a selective layer such as is sold under the trade designation "Calflex 81 K1" by the firm of Balzers AG in Balzers, Principality of Liechtenstein. This selective layer is practically completely transparent to short-wave light having a wave-length of 0.2 to 0.75 microns and reflects long-wave radiation above a wave-length of 0.75 microns.

In FIG. 5, the terrestrial solar spectrum is represented by a curve 17. The wavelengths in microns is entered along the abscissa and the radiation intensity along the ordinate. A curve 18 shows the heat radiation of a dark body, e.g., of the vessel of the vacuum flask according to FIG. 3, formed by the inner wall 11 surrounded by the outer wall 12.

An arrow 19 in FIG. 3 indicates that portion of the solar radiation which, relative to FIG. 5 to the left of a straight dashed line 20, penetrates through the selective layer 16 and strikes the inner wall 11 or, if the latter is transparent, directly strikes the substance with which the vessel has been filled, and is converted into heat at the point of incidence. The side of the inner wall 11 facing the space 13 comprises longitudinal ribs 27, running parallel to the longitudinal axis of the vacuum flask, for the purpose of increasing the surface area. Disposed upon this surface there is preferably a layer of as dark a colour as possible, e. g., so-called "black nickel", or the above-mentioned overlay of a layer of copper and a layer of a metallic carbide, for the absorption of the sunrays admitted by the selective layer 16.

The hatched area in FIG. 5 represents the energy which, per unit of time, reaches the inner wall 11 through the selective layer 16 and is converted into heat. This heat is then transferred to the substance with which the vacuum flask has been filled. When the temperature of this substance, or of the inner wall 11, is thereby raised, the inner wall 11 radiates long-wave rays towards the outside. However, this long-wave radiation is not allowed to pass to the outside by the selective layer 16 but is reflected back to the inner wall 11, as indicated by arrows 22 and 23 in FIG. 3.

Figuratively speaking, the arrangement described above results in a thermal rectifier effect through which the short-wave radiant energy reaches the inner wall 11, is absorbed there and converted into heat, and is stored as such in the vacuum flask because the long-wave radiation can no longer reach the outside, and the dissipation of heat is largely prevented by the vacuum in the space 13.

If such a vacuum flask is exposed to the light, particularly sunlight, more energy then reaches the inner wall 11, or the substance with which the flask is filled, thus heating this wall or substance, than is lost through heat losses occasioned by the conduction and/or radiation of heat. As a result the inner wall 11 or the substance is heated proportionally to the duration of irradiation. Tests have shown that cold water introduced into such a vacuum flask having a capacity of 0.5 liters reached boiling-point after 30–50 minutes of exposure to direct solar radiation. When the water-filled vacuum flask was exposed to diffused solar radiation, the boiling-point was reached after 2½ hours.

FIGS. 6 and 7 show an improved design of the vacuum flask according to FIGS. 3 and 4. A double-walled vessel formed by an inner wall 24 and an outer wall 25 is constructed in a similar manner to the double-walled vessel in the embodiment of FIGS. 3 and 4. Disposed on the side of the outer wall 25 facing an exhausted space 26 is a selective layer 27, e. g., of the "Calflex 81 K1" material already mentioned, which admits the short-wave solar radiation and reflects the long-wave portion of the radiation. A protective jacket comprises a bottom part 28 and a top part 29 which are kept spaced from one another by a transparent tubular part 30, preferably of glass. A resilient, heat-insulating ring 31 is disposed between the bottom part 28 and the base of the outer wall 25. Positioned along a generatrix of the tubular part 30 is a hinge 32 (visible only in FIG. 7), the ends of which are secured to the bottom part 28 and the top part 29, respectively. Hinged to the hinge 32 are two flaps 33 and 34 which, when closed (see FIG. 6), form, together with the parts 28 and 29, the protective jacket which protects the tubular part 30 from mechanical damage. The flaps 33 and 34 are held closed by a fastener 35 composed of a hook 36 fixed to the flap 33 and a toggle mechanism 37 of a known construction disposed on the flap 34.

The flaps 33 and 34 may be made of plastics, a light-reflecting layer 38 being applied to the inside of each of these flaps which, when opened out, thereby reflect the light-rays striking them to the double-walled vessel. By means of the reflective layers 38, the cross-section of the beam of solar rays striking the double-walled vessel is practically doubled, and the heating of the substance contained in the flask is substantially accelerated.

However the flaps 33 and 34 are preferably made of a resilient metal, so that when they are opened out, they spring into the approximate shape of a parabolic-cylindrical reflector, along the focal line of which the double-walled vessel is disposed. In FIG. 7, this shape of the opened flap 33 is represented by a dot-dash line 39. If the inner side of the metal flaps is polished, the application of a special reflective layer may be dispensed with. The hinge 32 is provided with a stop (not shown) so that the parabolic flaps cannot be opened out any farther than is shown by the dot-dash line 39. By means of this special design of the flaps 33 and 34, the proportion of collected solar radiation becomes even greater. In a test with such a vacuum flask having a capacity of 0.5 liters, cold water introduced into the flask reached boiling-point in 30 minutes under direct solar irradiation at an outside temperature of −10° C.

The vacuum flasks described above are very advantageous to use on excursions, especially on hikes in the mountains, since in many instances there will be no need to take along a stove. Substances introduced cold into the flask are heated in a relatively short time after the flask has been exposed to direct, or even diffused, solar radiation.

What is claimed is:

1. A vacuum flask comprising a vessel having an inner glass wall and an outer glass wall together bounding a substantially evacuated space and a protective jacket for enclosing said vessel, wherein a layer of a substance having a coefficient of absorption of at least 0.8 for short-wave light and a coefficient of emission not exceeding 0.1 for long-wave radiation is disposed on the surface of said inner wall facing said space.

2. A vacuum flask in accordance with claim 1, wherein said substance is black chromium or black nickel.

3. A vacuum flask in accordance with claim 1, wherein said protective jacket is transparent.

4. A vacuum flask in accordance with claim 1, wherein said protective jacket is provided on the inside thereof with a covering capable of entirely reflecting solar radiation and at least part of said jacket is swingable to an open position to form a reflector focusing solar radiation upon said vessel.

5. A vacuum flask comprising a vessel including a light permeable outer wall and an inner wall delineating with said outer wall a substantially evacuated space and characterized in that said inner wall includes a layer of a substance having a coefficient of absorption for short-wave light of at least 0.8 and a coefficient of emission for long-wave radiation not exceeding 0.1 disposed on the surface of said inner wall facing said evacuated space.

* * * * *